United States Patent
Baudelot et al.

(10) Patent No.: US 6,275,393 B1
(45) Date of Patent: Aug. 14, 2001

(54) NONLINEAR CURRENT LIMITING PRECHARGING CIRCUIT FOR A CAPACITOR CONNECTED TO AN OUTPUT OF A LINE-COMMUTATED POWER CONVERTER

(75) Inventors: Eric Baudelot, Weisendorf; Manfred Bruckmann, Nürnberg; Heinz Mitlehner, Uttenreuth; Benno Weis, Hemhofen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/508,011
(22) PCT Filed: Aug. 27, 1998
(86) PCT No.: PCT/DE98/02531
   § 371 Date: Mar. 6, 2000
   § 102(e) Date: Mar. 6, 2000
(87) PCT Pub. No.: WO99/13560
   PCT Pub. Date: Mar. 18, 1999

(30) Foreign Application Priority Data

Sep. 9, 1997 (DE) .............................. 197 39 553

(51) Int. Cl.[7] .................................. H02M 5/458
(52) U.S. Cl. .................. 363/37; 323/908; 320/166
(58) Field of Search ................. 363/37, 49; 323/908; 320/166

(56) References Cited

U.S. PATENT DOCUMENTS

| | | |
|---|---|---|
| 4,053,915 | 10/1977 | Cave . |
| 4,437,050 | 3/1984 | Overzet . |
| 4,573,113 | 2/1986 | Bauman . |
| 4,719,533 * | 1/1988 | Koch .................................. 361/230 |
| 5,315,497 | 5/1994 | Severinsky . |
| 5,420,780 * | 5/1995 | Bernstein et al. .................... 363/89 |
| 5,627,738 | 5/1997 | Lubomirsky et al. . |
| 5,715,154 * | 2/1998 | Rault .................................. 363/89 |
| 5,995,392 * | 11/1999 | Turner .................................. 363/49 |

FOREIGN PATENT DOCUMENTS

| | | |
|---|---|---|
| 92 16 662 | 3/1993 | (DE) . |
| 43 19 254 | 12/1993 | (DE) . |
| 43 30 381 | 3/1995 | (DE) . |
| 195 30 494 | 2/1997 | (DE) . |
| 197 17 614 | 4/1997 | (DE) . |
| 196 17 048 | 7/1997 | (DE) . |
| 0 648 003 | 4/1995 | (EP) . |
| WO 94/13004 | 6/1994 | (WO) . |

OTHER PUBLICATIONS

Patent Abstracts of Japan, vol. 97, No. 5, May 30, 1997 & JP 09 019003 A (Honda Motor Co. Ltd).
Patent Abstracts of Japan, vol. 13, No. 75 (P–831), Feb. 21, 1989 & JP 63 261408 A (Seiko Instr. & Electronics Ltd.).
Patent Abstracts of Japan, vol. 16, No. 31 (E–1159), Jan 27, 1992 & JP 03 243170 A(Mitsubishi Electric Corp.), Oct. 30, 1991.
Patent Abstracts of Japan, vol. 96, No. 3, Mar. 29, 1996 & JP 07 308020 A( Hitachi) Nov. 21, 1995.
Patent Abstracts of Japan, vol. 7, No. 276 (E–215), Dec. 9, 1983 & JP 58 154372 A (Meidensha KK).
Patent Abstracts of Japan, vol. 95, No. 7, Aug. 31, 1995 & JP 07 099325 A (Fuji Electric CL Ltd.), Apr. 11, 1995.

* cited by examiner

*Primary Examiner*—Adolf Denake Berhane
(74) *Attorney, Agent, or Firm*—Birch, Stewart, Kolasc h & Birch, LLP

(57) ABSTRACT

A circuit arrangement for precharging the capacitor connected to the output of a line-commutated power converter is described, where an element which limits the charging current of the capacitor to a level which is largely independent of the charging voltage is connected between a direct voltage output of the power converter and the respective terminal of the capacitor.

11 Claims, 2 Drawing Sheets

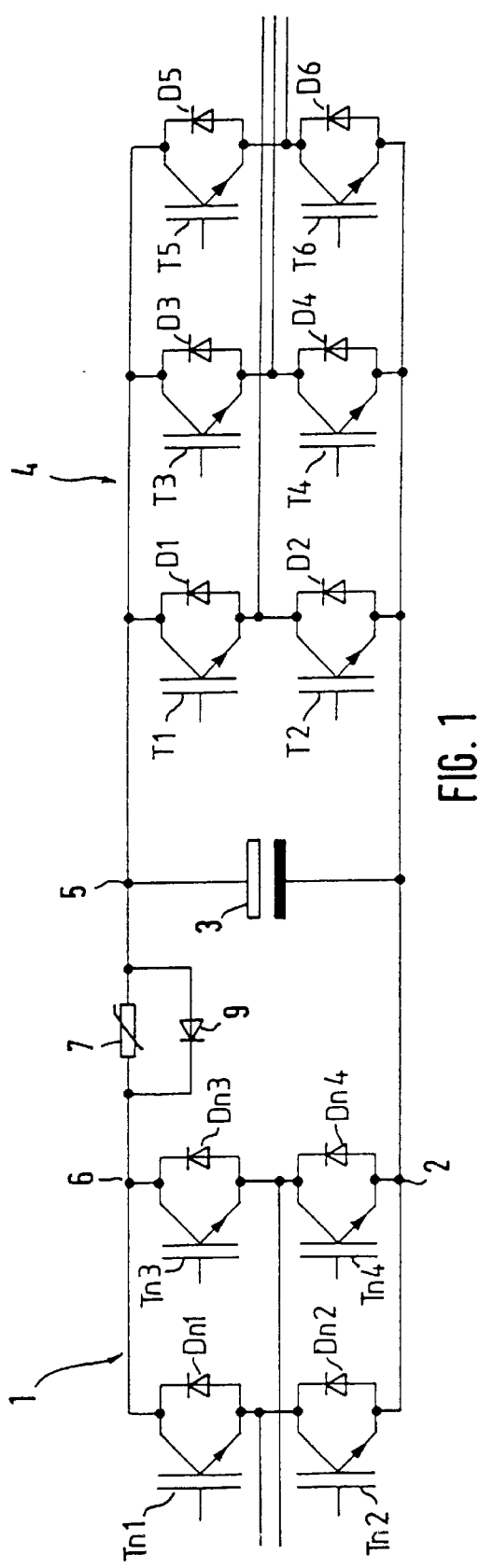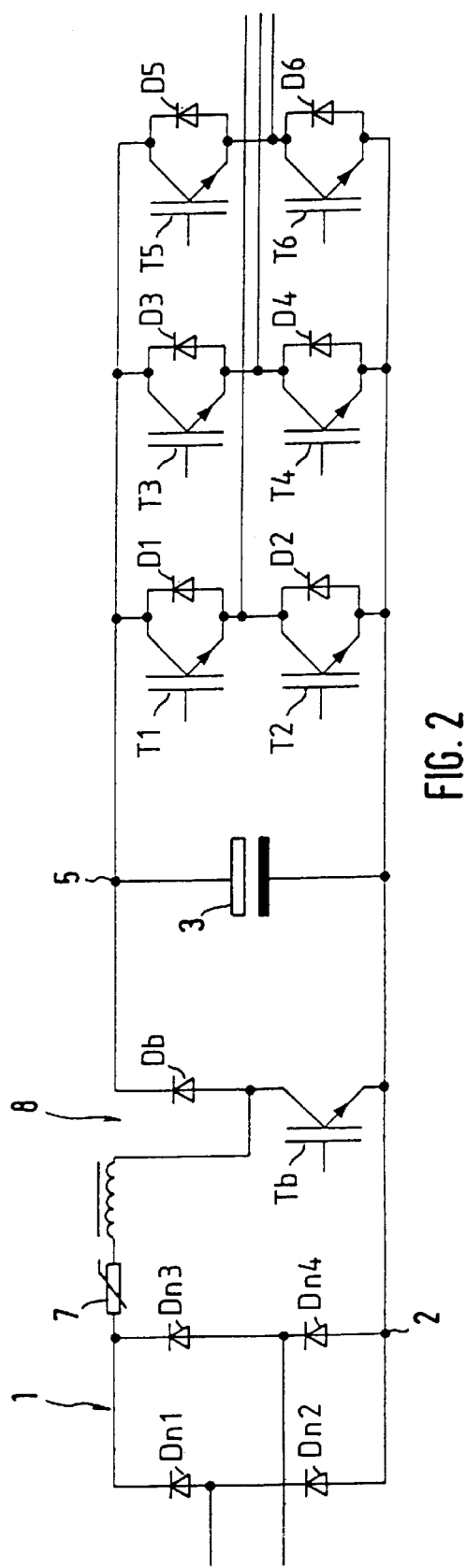
FIG. 1
FIG. 2

NONLINEAR CURRENT LIMITING PRECHARGING CIRCUIT FOR A CAPACITOR CONNECTED TO AN OUTPUT OF A LINE-COMMUTATED POWER CONVERTER

FIELD OF THE INVENTION

The present invention relates to a circuit arrangement for precharging a capacitor connected to the output of a line-commutated power converter.

BACKGROUND INFORMATION

High charging currents can occur when uncontrolled rectifier circuits are connected to a power system with capacitive smoothing at the output, because generalized phase control is impossible. In addition, an oscillating circuit formed by the capacitor and the line inductances may be activated by the high charging current due to the fact that damping of the respective current path is usually relatively low, thus leading to high, short-term voltage surges which can have a harmful effect on various parts of the circuit arrangement.

Conventionally, to avoid these negative effects, an ohmic resistor is connected into the current path for the precharging phase of the smoothing capacitor, resulting in the charging current being limited to a level which depends on the applied line voltage. After a predetermined period of time has elapsed or when a predetermined voltage threshold has been exceeded at the smoothing capacitor, the ohmic charging resistor can then be short-circuited by a contactor. However, due to the inertia of a mechanical contactor, such a starting current limiter cannot become effective again until after the elapse of a release time of the contactor, which is manifested, for example, in failure of a line half-wave in increased charging currents.

Use of an NTC thermistor does not yield any permanent improvement here, because due to the thermal time constant, this also has a certain inertia which does not allow it to react to the failure of a line half-wave.

German Utility Model 92 16 662 describes a precharging circuit for the capacitor at the output of a power converter, where precharging of the capacitor can take place across an ohmic resistor through a diode network connected between the power system and a terminal of the smoothing capacitor in parallel to the power converter. As soon as the capacitor is charged, normal operation can be resumed with the actual power converter. However, the capacitor here is constantly connected to the power system by way of the diode network, so it is impossible to lower the intermediate circuit voltage, for example reduce it to a lower voltage with controlled valves. On the other hand, this circuit makes sense only in conjunction with controlled rectifiers, because otherwise the rectifier, which is connected without an ohmic resistor, would immediately assume the role of carrying the current when switched on and would cause unwanted high charging currents.

SUMMARY

An object of the present invention, is to provide a circuit arrangement for precharging a capacitor connected to an output of a line-commutated power converter, which will reliably prevent the occurrence of current and/or voltage peaks when charging the capacitor and in particular even when there is a short-term failure of the line voltage. Furthermore, in combination with controlled rectifiers, the adjustability of the intermediate circuit voltage should not be impaired. Also as far as possible no additional losses should be caused after a charging operation by the circuit arrangement to be created.

This object is achieved in the present invention by connecting an element having a nonlinear current-voltage characteristic which limits the charging current of the capacitor to a value which is largely independent of the charging voltage between a direct voltage output of the power converter and the respective terminal of the capacitor instead of using ohmic current limiting resistors, previously connected upstream, with a largely linear current-voltage characteristic. The nonlinearity may be selected so that this element takes up part of the line voltage only above a predetermined current level, and thus it is hardly noticeable at lower currents and therefore causes hardly any losses in long-term operation. Since this element does not go into effect below the current level to be limited, it is also readily possible to adjust the intermediate circuit voltage. Finally, the nonlinearity of the characteristic here completely replaces the circuit dynamics necessary for functioning with contactor circuits or NTC thermistor circuits, so the shortest possible response times can be implemented.

The dimensions of the current limiting element should be such that the threshold value at which current limiting begins is above the typical charging current. In this way, effective damping of the charging circuit can be achieved in the fastest possible way after the respective limit value is exceeded, so that hardly any oscillations occur, and in particular there are no harmful voltage peaks.

For high dynamics of the current limiter according to the present invention, a response time of less than 1 ms for the current limiting element is advantageous. In such a case, development of current peaks can be effectively suppressed from the beginning, and there is hardly any voltage oscillation.

To simplify this circuit, it may be advantageous for the current limiting element to be designed as a passive component. The reliability of the circuit is also increased in this way, because the current limiting efficiency does not depend on the presence of an additional power supply voltage.

According to an example embodiment of the present invention, a semiconductor component is used to implement the nonlinear current-voltage characteristic of the current limiter. SiC may be used as the semiconductor material because it has a high thermal stability and thus can also absorb excess energy in a current limiting case. SiC can also dissipate the respective energy amount to the environment in the shortest possible time because of its high thermal conductivity. These advantageous properties are associated with a high dielectric strength, so that even high voltage peaks can be absorbed without difficulty.

The semiconductor current limiter according to the present invention may be designed internally according to the principle of a two-pole field effect constant current source having a first semiconducting range between the two outer terminals which carries the charging current path of the capacitor and is tapered like a channel in some areas due to semiconducting areas with the opposite type of doping. With an increasing charging current, the voltage drop within the semiconductor element increases, so the p-n junctions in the blocking direction are prestressed and thus their cross section is increased, so the current path is narrowed or even constricted in the area of the channel, and the current is limited to a predetermined level by the resulting increase in resistance.

Such a passive semiconductor current limiter is described in German Patent Application No. 197 17 614.

The current limiting circuit according to the present invention can be used with special advantages with uncontrolled rectifiers because they begin to function immediately when first switched on and are no longer apparent after conclusion of the charging operation. On the other hand, the rectifier may also be designed as a controlled bridge circuit so that the power recovered when a consumer is shut down can optionally be fed back into the power system.

Special advantages are also derived when an intermediate voltage circuit is formed when the capacitor connected to the output of the power converter is also connected to a power supply unit, in particular a switched-mode power supply for supplying power, or a power converter, in particular an inverter for generating a variable voltage for supplying an electric motor. Since the current limiting element according to the present invention is connected into the circuit of the rectifier, switching consumers with sudden changes in current can readily be operated on the smoothing capacitor. The resulting steady changes in capacitor voltage result in charging currents during operation which are subject to harmonics, but only in the rarest of cases do they reach an amplitude that activates the limiting function of the current limiting element according to the present invention. Nevertheless, it is ready for immediate response at any time and thus ensures an optimum lifetime of the respective power converter even when the connected consumer causes pulsating load currents.

It is also within the scope of the present invention to connect a filter, in particular an active harmonic filter, downstream from the nonlinear current limiting element. Smoothing of the charging current can also be achieved in this way, thus minimizing system perturbation due to the power converter.

In particular when using a rectifier controlled for the purpose of feeding power back into the network, there is the risk that the intermediate circuit capacitor might be discharged suddenly over the rectifier when the line voltage collapses. However, the current limiting element according to the present invention will not be effective in such a case, because even with this current direction, which is now in the opposite direction, a current path can develop within the semiconductor chip. Then with an increase in current, the voltage drop at the integrated resistance element leads to a reduction in the blocking voltage at the p-n junctions arranged in the vicinity of the channel, the extent of which is thus reduced. Thus, the channel resistance is reduced and the current can assume very high values within an extremely short period of time, releasing a considerable amount of thermal energy at the integrated resistor due to the voltage drop, which could destroy the current limiting element within an extremely short period of time. To prevent this operating case, the present invention therefore proposes a diode connected in antiparallel to the current limiting element, allowing the intermediate circuit capacitor to discharge in the event of a system voltage failure without causing any damage to the current limiting element which is not in operation.

Finally, according to the present invention, the diode connected in antiparallel to the current limiting element is Schottky diode. Such diodes have extremely short switching times and also have a conducting-state voltage drop of approximately 0.3 V, so a harmful current flowing away to the power system can be diverted around the current limiting element without any risk.

BRIEF DESCRIPTION OF THE DRAWINGS

FIG. 1 shows the precharging circuit according to the present invention in a converter having a two-phase rectifier and a three-phase inverter.

FIG. 2 shows a circuit arrangement like that in FIG. 1 having an additional active harmonic filter.

DETAILED DESCRIPTION

Figure 3:
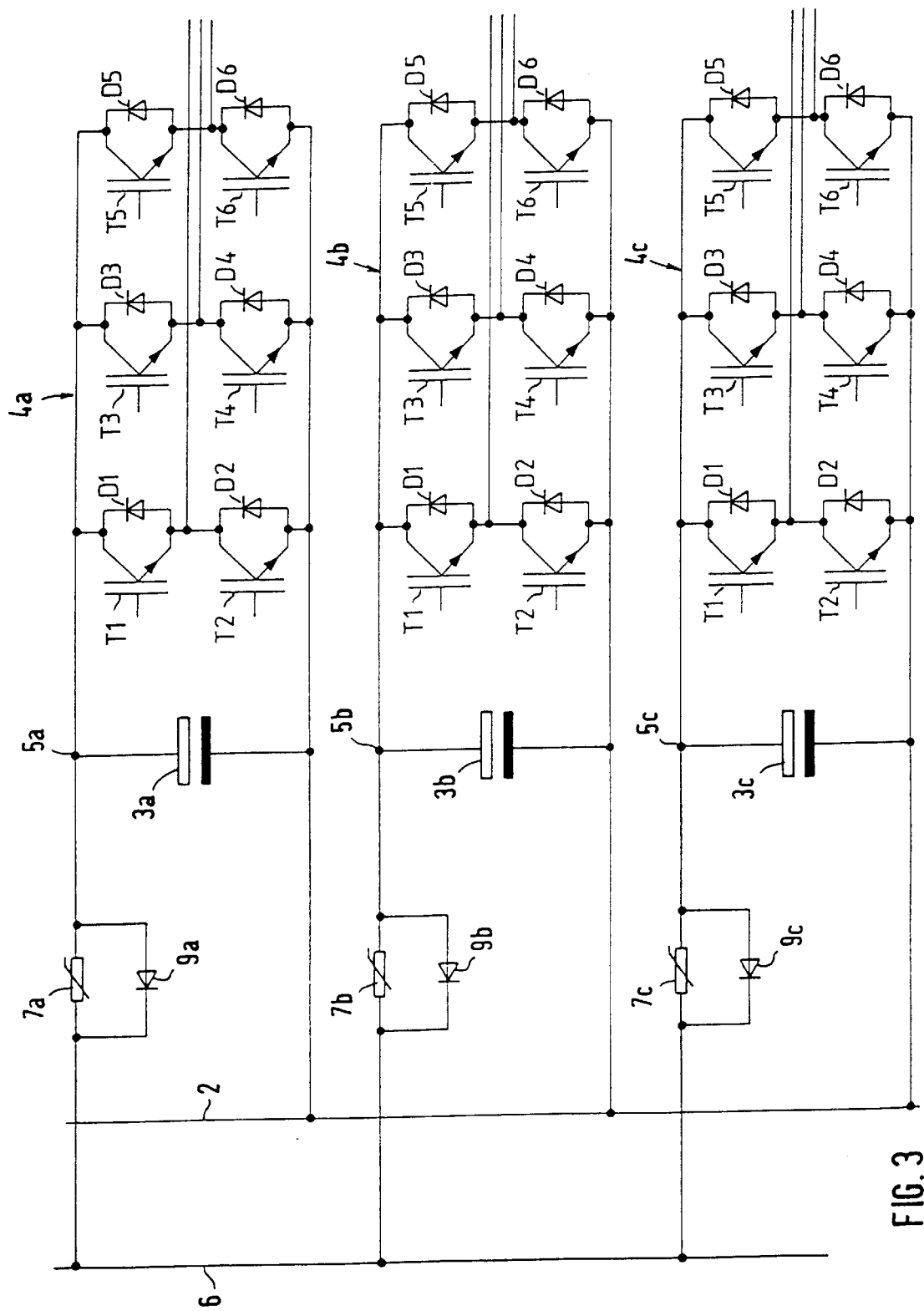
FIG. 3 shows the circuit according to the present invention with a parallel connection of multiple inverters to a common direct voltage source, each by way of a respective intermediate circuit capacitor.

FIG. 1 shows a full-wave rectifier 1 that includes four diodes DN1–Dn4 and is connected at the a.c. end to a 220 V line. The negative pole 2 of full-wave rectifier 1 is connected to a terminal of a smoothing capacitor 3 which supplies a smoothed, intermediate direct voltage which is converted to a three-phase output voltage for connection of a consumer by an inverter 4 in a three-phase bridge circuit composed of n controlled transistors T1–T6 and freewheeling diodes D1–D6 each connected in parallel.

Capacitor 3 has a relatively large capacitance for the purpose of good smoothing, so adequate limiting of the charging current would not be achieved with a direct connection of its positive electrode 5 to the positive pole 6 of the full-wave rectifier 1. To this end, the present invention provides a two-pole current limiting element 7 between positive output terminal 6 of rectifier 1 and positive electrode 5 of the smoothing capacitor 3. Because of a nonlinear characteristic of the current limiting element 7, it takes up a corresponding portion of the output voltage of the rectifier 1 only when a predetermined charging current level has been exceeded, thus limiting the charging current flowing through the capacitor 3. At the same time, this current path is dampened, so that there is no overswing of the output voltage on the rectifier 1. The current limiting element 7 is for this purpose designed as a semiconductor limiter. The internal functionality approximately follows the principle of a field effect constant current source having a source resistor integrated into the semiconductor chip. Due to a voltage drop caused by excessive currents on this source resistor, p-n junctions limiting the current path are prestressed to a greater extent in the blocking direction. Due to the resulting widening of these p-n junctions, the remaining current path is narrowed and thus its resistance is increased, so there is a more-than-proportional increase in the voltage drop upon exceeding a current limit value, while the current limit value is maintained approximately. Current limiting element 7 is made of SiC semiconductor material and therefore can absorb short-term power peaks and dissipate them to the outside through its housing.

In order for power returning to the intermediate circuit capacitor 3 when a consumer is switched off to be able to return to the power system, the power transistors Tn1–Tn4 are each connected in antiparallel to rectifier diodes Dn1–Dn4. During such a feedback phase, the current flow in the intermediate circuit is reversed. With this current direction, current limiting element 7 cannot fulfill its function, so that relatively large current peaks could occur with line-side short circuits which could cause the destruction of current limiting element 7. To reliably prevent damage to current limiting element 7 even in this case, a Schottky diode 9 is connected in antiparallel to it. The Schottky diode 9 is capable of diverting the entire feedback current around current limiting element 7 because of its low conducing-state voltage of approximately 0.3 V.

With the arrangement according to FIG. 2, an active harmonic filter 8, which is capable of smoothing harmonics in the charging current of the capacitor 3 and diverting them to the negative output terminal 2 of the full-wave rectifier 1, is connected between the current limiting element 7 and the positive electrode 5 of the electrolytic capacitor 3.

Finally, FIG. 3 shows a circuit arrangement where direct voltage outputs 6, 2 of a rectifier (not shown) are each connected to a plurality of parallel-connected inverters 4a–4c each by way of a smoothing capacitor 3a–3c, which inverters in turn function to permit individual control of the connected consumers. With such a circuit structure, a current limiting element 7a–7c is connected between the positive output terminal 6 of the common rectifier and the positive electrode terminals 5a–5c of all the capacitors 3a–3c in order to be able to limit the charging currents of all the capacitors independently of one another and protect the rectifier from overload in the event of a short circuit on the output side of the inverters 4a–4c due to immediate response of the respective current limiting element 7a–7c. In this way, the respective intermediate circuit is largely isolated from common direct voltage source 6, 2, so that the other intermediate circuits do not suffer any great voltage collapse and the other consumers can still be operated. The Schottky diodes 9a–9c prevent damage to the current limiting elements 7a–7c in the event of a short circuit in direct voltage circuit 6, 2.

What is claimed is:

1. A circuit arrangement for precharging a capacitor, comprising:
    a line-commutated power converter having a direct voltage output, the capacitor being coupled to the output of the power converter; and
    a current limiting element limiting a charging current of the capacitor connected between the direct voltage output of the power converter and a first terminal of the capacitor, the current limiting element being a passive semiconductor current limiter having a nonlinear current-voltage characteristic so that the charging current is limited to a level which is substantially independent of the charging voltage, the semiconductor current limiter functioning in a manner approximately corresponding to a field effect constant current source.

2. The circuit arrangement according to claim 1, wherein the current limiting element is dimensioned so that the limit level is above a normal charging current of the capacitor.

3. The circuit arrangement according to claim 1, wherein the current limiting element has a response time of less than 1 ms.

4. The circuit arrangement according to claim 1, wherein a semiconductor material of the semiconductor current limiter is SiC.

5. The circuit arrangement according to claim 1, wherein the power converter is an uncontrolled rectifier.

6. The circuit arrangement according to claim 5, further comprising:
    a controlled inverter connected in antiparallel to the uncontrolled rectifier for feeding power back into a power system.

7. The circuit arrangement according to claim 1, wherein an intermediate voltage circuit is formed by the capacitor connected to the output of the power converter, the circuit arrangement further comprising:
    one of: i) a switched mode power supply connected to the intermediate circuit for supplying power, and ii) an inverter connected to the intermediate circuit for generating a variable voltage for supplying an electric motor.

8. The circuit arrangement according to claim 1, further comprising:
    an active harmonic filter connected downstream from the current limiting element.

9. The circuit arrangement according to claim 1, further comprising:
    a diode connected in antiparallel to the current limiting element.

10. The circuit arrangement according to claim 9, wherein the diode is a Schottky diode.

11. The circuit arrangement according to claim 9, wherein the semiconductor material of the diode is made of SiC.

* * * * *